(12) United States Patent
Romero

(10) Patent No.: US 7,143,786 B2
(45) Date of Patent: Dec. 5, 2006

(54) TWO-HANDLE FLOW-THROUGH VALVE

(75) Inventor: Oscar Romero, Lake Forest, CA (US)

(73) Assignee: Newfrey LLC, Newark, DE (US)

(*) Notice: Subject to any disclaimer, the term of this patent is extended or adjusted under 35 U.S.C. 154(b) by 153 days.

(21) Appl. No.: 10/733,905

(22) Filed: Dec. 11, 2003

(65) Prior Publication Data

US 2005/0126643 A1 Jun. 16, 2005

(51) Int. Cl.
*F16K 11/20* (2006.01)
(52) U.S. Cl. ............... 137/606; 137/594; 137/625.31; 137/637.3
(58) Field of Classification Search ............. 137/606, 137/594, 637.3, 625.31
See application file for complete search history.

(56) References Cited

U.S. PATENT DOCUMENTS

| | | | |
|---|---|---|---|
| 1,191,700 A * | 7/1916 | Howes ............ 251/180 |
| 3,625,255 A | 12/1971 | Genin |
| 3,810,602 A | 5/1974 | Parkinson |
| 3,831,621 A | 8/1974 | Anthony et al. |
| 3,987,819 A | 10/1976 | Scheuermann |
| 4,793,375 A | 12/1988 | Marty |
| 4,887,793 A * | 12/1989 | Hernandez et al. ........ 251/208 |
| 4,901,750 A * | 2/1990 | Nicklas et al. .......... 137/637.3 |
| 4,924,903 A | 5/1990 | Orlandi |
| 4,944,330 A | 7/1990 | Sakakibara et al. |
| 4,946,134 A | 8/1990 | Orlandi |
| 5,070,906 A | 12/1991 | Orlandi |
| 5,107,884 A | 4/1992 | Orlandi |
| 5,127,438 A * | 7/1992 | Williams ............. 137/625.31 |
| 5,150,737 A | 9/1992 | Clerc |
| 5,402,827 A | 4/1995 | Gonzalez |
| 5,704,588 A | 1/1998 | Korfgen et al. |
| 5,853,023 A | 12/1998 | Orlandi et al. |
| 5,904,336 A | 5/1999 | Niakan et al. |
| 5,941,503 A | 8/1999 | Niakan et al. |
| 5,971,359 A | 10/1999 | Niakan et al. |
| 6,016,830 A | 1/2000 | Niakan et al. |
| 6,202,693 B1 | 3/2001 | Bollo |
| 6,296,017 B1 | 10/2001 | Kimizuka |

* cited by examiner

Primary Examiner—Stephen M. Hepperle
(74) Attorney, Agent, or Firm—Harness, Dickey & Pierce, P.L.C.

(57) ABSTRACT

A flow-through valve is provided and includes a housing connecting first and second ends to allow fluid flow from the first end to the second end. The first end includes first and second inlet ports, while the second end portion includes an outlet port. The flow-through valve further includes a valve cartridge including a first fixed disk having an opening thereon, a first moveable disk in fluid communication with the first fixed disk, a second fixed disk having an opening thereon and a second moveable disk in fluid communication with the second fixed disk. The fixed disks and moveable disks may be configured within the valve cartridge to independently adjust the hot/cold water flow or the temperature/flow rate.

22 Claims, 6 Drawing Sheets

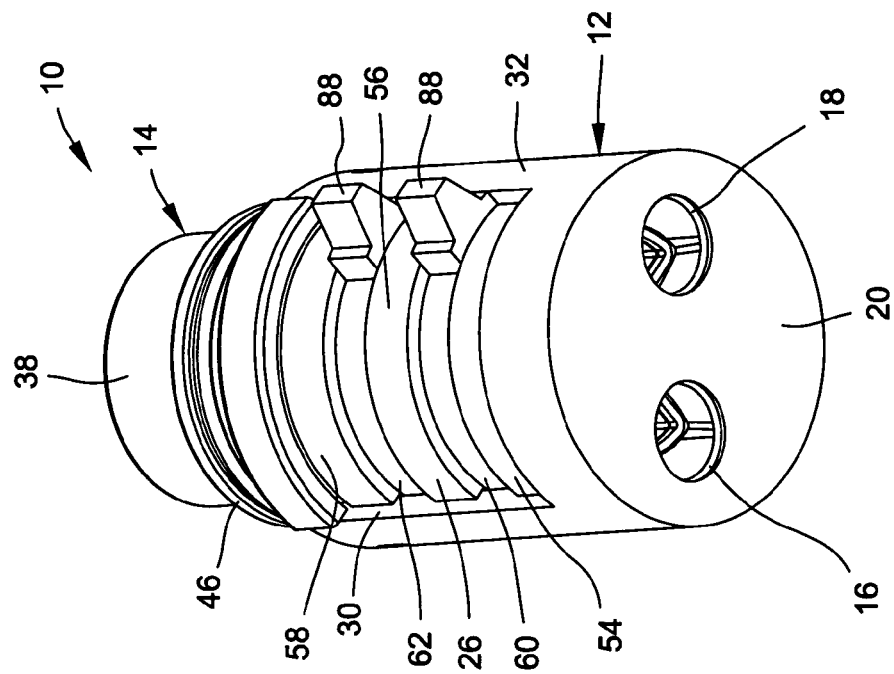
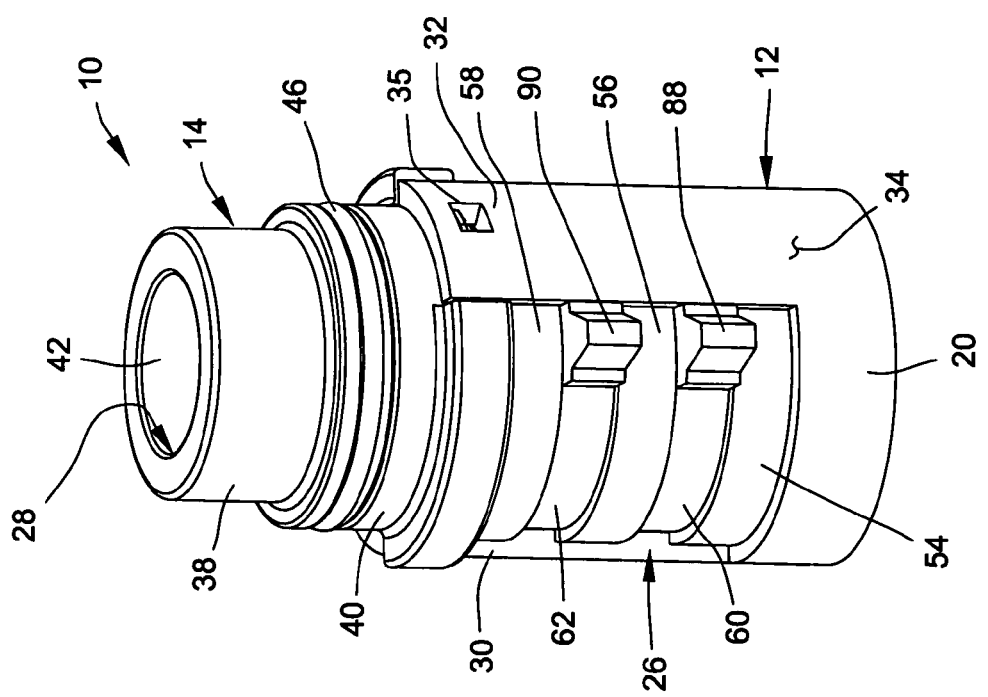

US 7,143,786 B2

TWO-HANDLE FLOW-THROUGH VALVE

BACKGROUND OF THE INVENTION

The present invention relates to a flow-through valve assembly for a faucet, and more particularly to a two-handled flow-through valve assembly alternately configurable to provide adjustment of the hot and cold water or the flow rate and temperature.

Various valves to control the flow of hot and cold water are known for residential applications such as kitchen or lavatory fixtures or bath/shower fixtures. Such conventional valves operate in one of two modes—a hot/cold water control mode or a temperature/flow rate mode. However, such valves are not readily configurable to operate in either mode. Accordingly, there is a need for a valve design which may be adapted to provide either control mode.

Conventional valves include a radial outlet or discharge from the valve body so water flows axially into and radially out from the valve. As such, conventional valves limit the shape of the faucet and the placement of the valve. Accordingly, there is a need for a flow-through valve design in which water flows axially into and out from the valve.

SUMMARY OF THE INVENTION

The present invention provides a flow-through valve including a valve housing having an outer cylindrical wall connecting first and second axially offset end portions to allow in-line fluid flow from the first end portion to the second end portion. The housing includes first and second inlet ports while the end portion includes an outlet port for discharging the fluid. In addition, the flow-through valve includes a valve cartridge having a first fixed disk disposed in the housing having an opening therethrough and a first moveable disk disposed in the housing and in fluid communication with the first fixed disk. The first moveable disk is rotatable within the valve housing and cooperates with the first fixed disk to selectively control fluid flow rate from the first inlet port to the outlet port. The first moveable disk includes a first actuating arm extending radially outwardly therefrom for selectively rotating the first moveable disk.

The valve cartridge further includes a second fixed disk disposed in the housing having an opening therethrough and a second moveable disk disposed in the housing and in fluid communication with the second fixed disk. The second moveable disk is rotatable within the valve housing and is operable to cooperate with the second fixed disk to selectively control fluid flow rate from the second inlet port to the outlet port. The second moveable disk further includes a second actuating arm extending radially outwardly therefrom for selectively rotating the second moveable disk.

In one configuration, the rotating disks are configured to provide a hot/cold control valve wherein manipulation of a first rotating disks adjusts the flow rate of hot water through the valve assembly and adjustment of the second rotating disks controls the flow rate of cold water through the valve assembly. The valve assembly is alternatively configurable so as to provide a flow/temperature valve control wherein manipulation of the first rotating disk controls the flow rate of water through the valve assembly and manipulation of the second rotating disk controls the temperature of the water flowing through the valve assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 1 is a top perspective view of a valve assembly in accordance with the principles of the present invention;

FIG. 2 is a bottom perspective view of the valve assembly of FIG. 1;

DETAILED DESCRIPTION OF THE PREFERRED EMBODIMENTS

The following description of the preferred embodiments is merely exemplary in nature and is in no way intended to limit the invention, its application, or uses.

Figure 3:
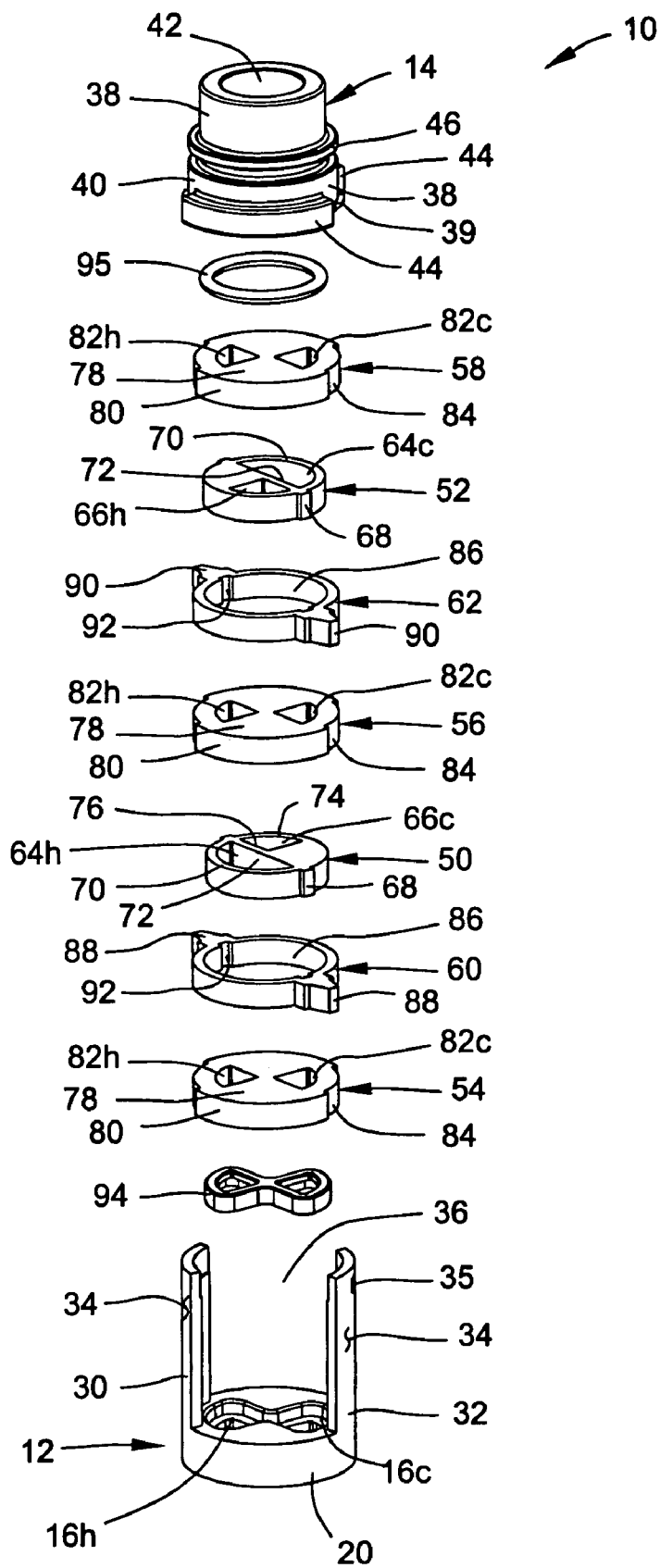
FIG. 3 is an exploded perspective view of the valve assembly of FIG. 1 configured as a hot/cold control valve.
Figure 4:
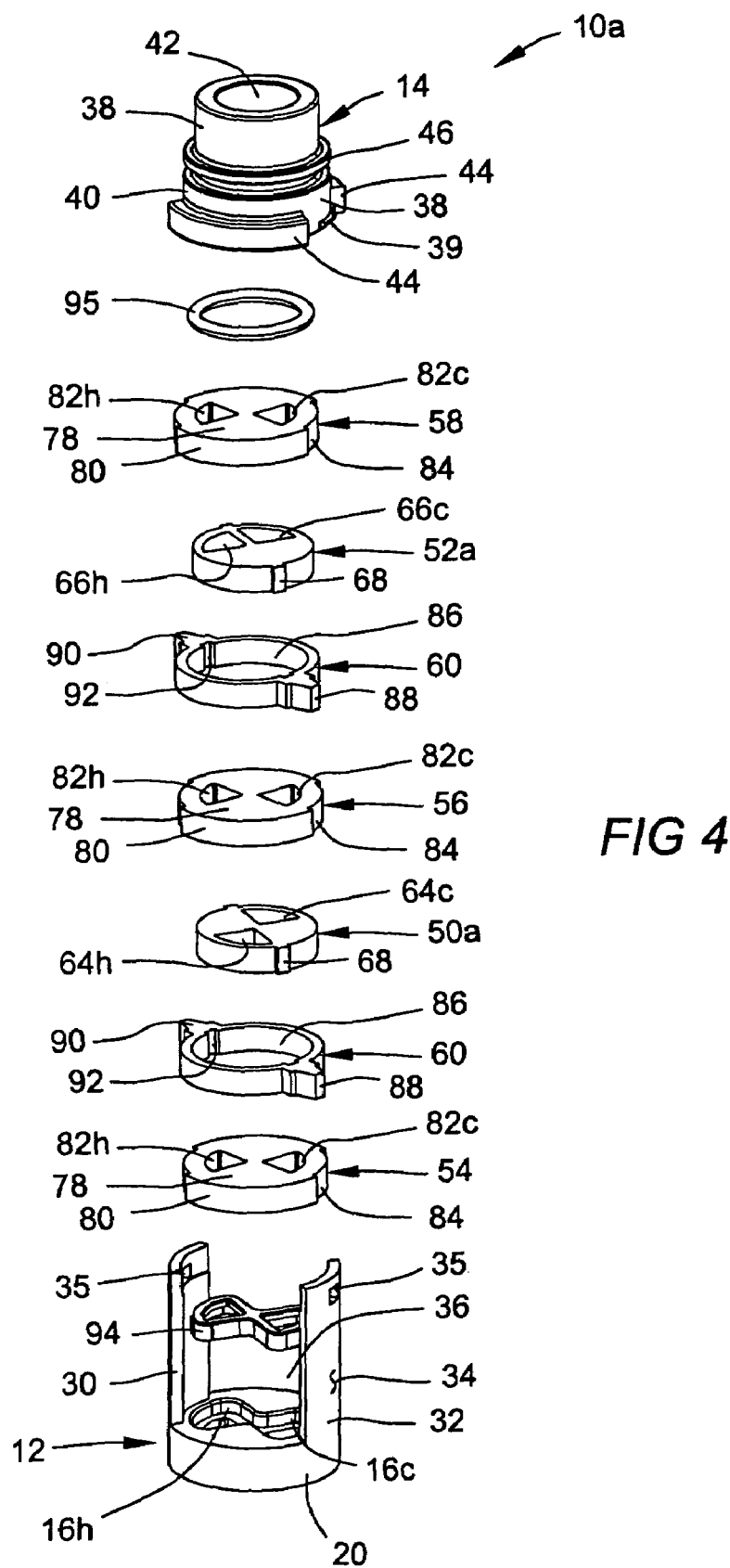
FIG. 4 is an exploded perspective view of the valve assembly of FIG. 1 configured as a flow/temperature control valve.
Figure 6:
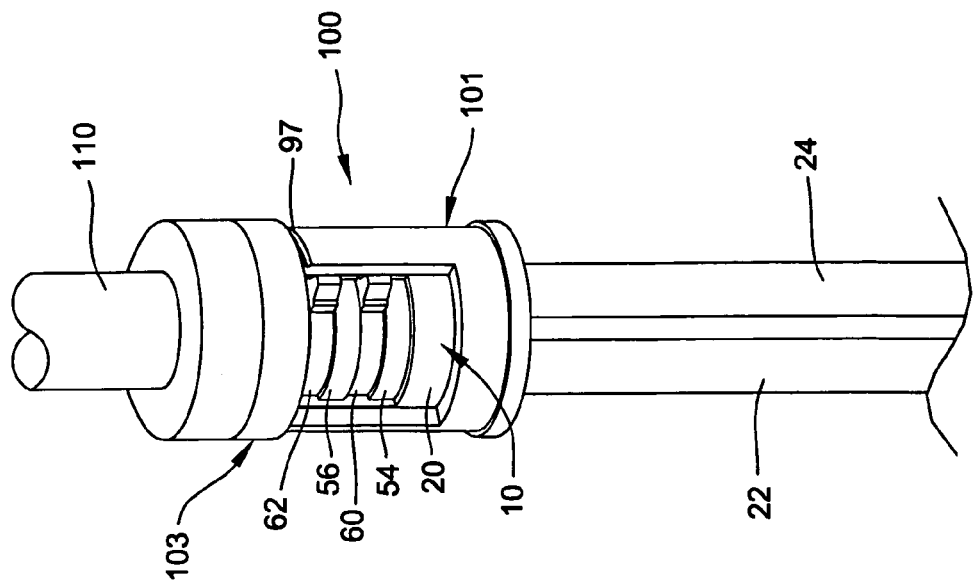
FIG. 6 is an assembled perspective view of the valve assembly of FIG. 5 coupled to the supply lines.
Figure 5:
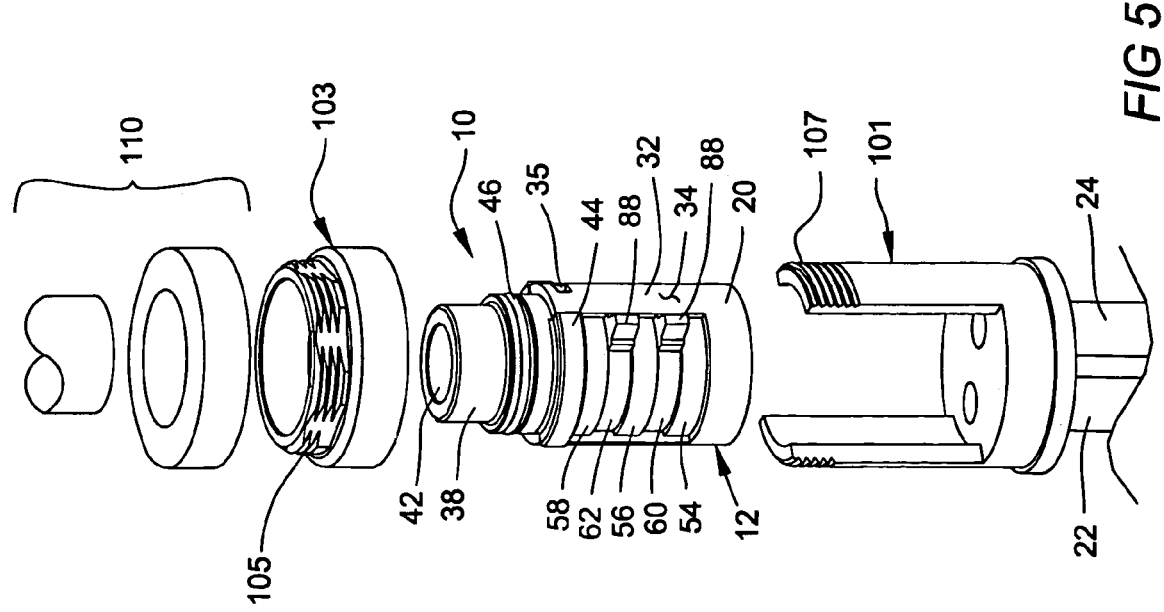
FIG. 5 is an exploded perspective view of the valve assembly of FIG. 1 configured coupled to supply lines.

With reference to FIGS. 1–6, a valve assembly 10 is provided and includes a valve body 12 and a valve cap 14. The valve body 12 includes a first and second bore 16c, 16h formed through a bottom portion 20, whereby the first and second bores 16c, 16h enable fluid communication between the valve body 12 and a pair of water supply lines 22, 24 (as seen in FIGS. 5 and 6). In addition, a valve cartridge 26 is supported within valve body 12 to selectively control water supplied through the valve assembly 10 and discharged from an outlet port 28 formed through the valve cap 14.

The valve body 12 includes the bottom portion 20 and first and second arms 30, 32 integrally formed therewith. As best shown in FIGS. 3 and 4, the bottom portion 20 is a generally cylindrical body having the first and second bores 16c, 16h formed therethrough in a generally diametric relationship. The first and second arms 30, 32 extend from the bottom portion, whereby each arm 30, 32 includes an arcuate surface 34 defining a portion of a cylindrical wall extending axially upward from bottom portion 20. In this manner, the first and second arms 30, 32 cooperate with the bottom portion 20 to define an interstitial space 36 operable to receive the valve cartridge 26, as will be discussed further below.

The valve cap 14 includes a first and second cylindrical portion 38, 40, a central bore 42 formed therethrough, and a pair of flanges 44. The first cylindrical portion 38 is disposed adjacent the second cylindrical portion 40 and is adapted to retain a seal 46, as best shown in FIG. 1. The flanges 44 extend from the second cylindrical portion 40 and define recesses 48 therebetween. The recesses 48 are operable to receive the first and second arms 30, 32 of the valve body 12, when the valve 10 is assembled. A pair of tabs 39 extend from the second cylindrical portion 40 in recesses 48 and engage apertures 35 formed through first and second arms 30, 32. In this manner, the valve cap 14 may be releasably coupled to the valve body 12. The valve cartridge 26 is disposed between the second cylindrical section 40 of the valve cap 14 and the bottom portion 20 of the valve body 12 and is operable to control an amount of fluid flowing through the first and second bores 16c, 16h, as will be discussed further below.

With reference to FIG. 3, a first embodiment of the valve cartridge 26 is provided and includes a first and second rotatable disk 50, 52, a first, second, and third stationary disk 54, 56, 58, and a first and second disk driver 60, 62. The first and second rotatable disks 50, 52 are generally cylindrical members and include a pair of ears 68 extending from an outer edge thereof. The first rotatable disk 50 includes first and second bore 64h, 66c while the second rotatable disk 52 similarly includes a first and second bore 64c, 66h. The first bores 64h, 64c include a generally arcuate surface 70 disposed opposite a straight or planer surface 72, whereby the arcuate surface 70 cooperates with the straight surface 72 to form the shape of a semicircular aperture. The second bores 66c, 66h are formed adjacent the first bores 64c, 64h and include an arcuate surface 74 formed between a pair of straight surfaces 76, as best shown in FIG. 3. The pair of straight surfaces 76 cooperate with the arcuate surface 74 to form a generally quartercircular or triangular-shaped aperture.

The first, second, and third stationary disks 54, 56, 58 each include a generally circular main body 78, a pair of flanges 80, and a pair of bores 82c, 82h. The flanges 80 extend from the main body 78 and serve to form a pair of recesses 84 therebetween, as best shown in FIG. 3. The recesses 84 engage arms 30, 32 to align the first, second, and third stationary disks 54, 56, 58 with the valve body 12 and prevent rotation therebetween. Specifically, the recesses 84 receive the first and second arms 30, 32 of the valve body 12 and serve to prevent rotation of the first, second, and third stationary disks 54, 56, 58 relative to the valve body 12 through the engagement of the arms 30, 32 with the flanges 80. In this manner, the recesses 84 concurrently prevent rotation of the disks 54, 56, 58 and help align the valve cartridge 26 with the valve body 12. The bores 82c, 82h are formed in a diametric relationship and generally include a quartercircular or triangular shape similar to that of the second bores 66c, 66h of the first and second rotatable disks 50, 52.

The first and second disk drivers 60, 62 include a central bore 86 and first and second extensions 88, 90. The central bore 86 of the first and second disk drivers 60, 62 receive the first and second rotatable disks 50, 52, respectively for rotation therewith. Specifically, an inner surface of bore 86 includes a pair of slots 92 formed opposite one another, whereby the slots 92 receive the ears 68 of the rotatable disks 50, 52. In this manner, the engagement between the ears 68 and the slots 92 serves to selectively fix the rotatable disks 50, 52 for co-rotation with the disk drivers 60, 62. To rotate the disk drivers 60, 62, and ultimately the rotatable disks 50, 52, a force is applied to the first and second extensions 88, 90 to rotate rotatable disks 50, 52.

As previously discussed, the valve cartridge 26 is disposed between the valve cap 14 and the bottom portion 20 once assembled. To assemble the valve cartridge 26 to the valve body 12, the rotatable disks 50, 52, stationary disks 54, 56, 58, and disk drivers 60, 62 are stacked in a predetermined relationship relative one another. Specifically, the first stationary disk 54 is placed adjacent the bottom portion 20 with a gasket 94 disposed therebetween. The gasket 94 effectively seals an area around the bores 16c, 16h of the valve body 12 and the bores 82c, 82h of the stationary disk 54, whereby the gasket 94 allows fluid flow from the bottom portion 20 to the stationary disk 54 but prevents leakage therefrom. The first stationary disk 54 is aligned with the bottom portion 20 such that the bores 82c, 82h of the disk 54 align with the bores 16c, 16h of the valve body 12. As previously discussed, the interaction between the recesses 84 and the arms 30, 32 facilitates alignment of the first disk 54 with the valve body 12 and further ensures proper alignment of the bores 82c, 82h with the bores 16c, 16h.

Once the first stationary disk 54 is in place, the first disk driver 60 and first rotatable disk 50 are rotatably assembled to the valve body 12, whereby the first rotatable disk 50 is fixedly received by the central bore 86 of the first disk driver 60, as previously discussed. The first and second extensions 88, 90 are assembled to the valve body 12 such that they are free to rotate between the first and second arms 30, 32, as best shown in FIG. 1. In this regard, a range of motion is defined between the first and second arms 30, 32, whereby a first position is established when the first extension 88 contacts the first arm 30 of the valve body 12 and a second position is established when the second extension 90 contacts the first arm 30 of the valve body 12.

Once the first disk driver 60 and first rotatable disk 50 are assembled, the second stationary disk 56 is aligned with the valve body 12. The second stationary disk 56 is assembled to the valve body 12 in the same manner as the first stationary disk 54, whereby the recesses 84 align with the first and second arms 30, 32 to align the bores 82c, 82h with the bores 16c, 16h and further to prevent rotation between the second stationary disk 56 and the valve body 12. The second disk driver 62 and second rotatable disk 52 are assembled to the valve body 12 in the same manner as the fist disk driver 60 and first rotatable disk 50, whereby the first and second extensions 88, 90 are assembled to the valve body 12 such that they are free to rotate between the first and second arms 30, 32. Again, a range of motion is defined between the first and second arms 30, 32, whereby a first position is established when the first extension 88 contacts the first arm 30 of the valve body 12 and a second position is established when the second extension 90 contacts the first arm 30 of the valve body 12.

The third stationary disk 58 completes the installation of the valve cartridge 26 to the valve body 12, whereby the recesses 84 of the disk 58 are aligned with the first and second arms 30, 32 of the valve body 12 to properly align the bores 82c, 82h of the disk 56 with the bores 16c, 16h of the lower portion 20. To maintain the relationship between the rotatable disks 50, 52, stationary disks 54, 56, 58, and disk drivers 60, 62, the valve cap 14 fixedly engages the first and second arms 30, 32 of the valve body 12. Specifically, the arms 30, 32 are received by the recess 48 of the valve cap 14, whereby tabs 39 fixedly engage the apertures 35 formed in the first and second arms 30, 32. In addition, an O-ring 95 is disposed between the valve cap 14 and the third stationary disk 56 to prevent fluid from escaping therebetween, and further to ensure that the fluid may be received through the central bore 42 of the valve cap 14.

With reference to FIGS. 5 and 6, a coupling 100 is operable to connect the valve assembly 10 within a faucet neck 110. The coupling 100 includes a valve housing 101 and a cap 103. The valve housing 101 is generally cylindrical in shape with a portion of the sidewalls removed to afford access to the valve assembly 10 and specifically the extensions 88, 90. In this manner, valve housing 101 is similar to valve body 12. The cap 103 secures the valve body 12 within the valve housing 101. A threaded interface 107 is provided between the valve housing 101 and the cap 103. A set of external threads 105 is also provided on cap 103 to connect the coupling 100 within the faucet neck 110.

As can be appreciated from the above description, each disk 50, 52, 54 must seal at the interface with the adjacent disk(s) to provide proper functioning of the valve cartridge. For this reason, the use of a ceramic valve disk is presently preferred. However, one skilled in the art will recognize the other types of valve disks which provide adequate sealing at the disk interface may be utilized in the present invention.

With reference to the Figures, the operation of the valve assembly 10 will be described in detail. The valve assembly 10 is operable to control the temperature of a flow of water entering the bottom portion 20 through bores 16c and 16h. Specifically, the valve assembly 10 regulates the flow of hot and cold water entering the bores 16c and 16h respectively to provide a desired output temperature through the bore 42 of the valve cap 14.

To control the flow of hot and cold water, the rotatable disks 50, 52 are rotated counter-clockwise from a first position to a second position to selectively align the bores 66c, 66h with the bores 16c, 16h of the bottom portion 20. Specifically, to allow a flow of cold water to reach the outlet bore 42 of the valve cap 14, the first disk driver 60 is rotated generally from the first position to the second position by applying a force to the first extension 88. Rotation of the disk driver 60 causes concurrent rotation of the first rotatable disk 50, whereby sufficient rotation of the disk 50 causes the bore 66c to align with the first bore 16c of the bottom portion 20, thereby allowing a flow of cold water to enter the valve body 12. As the first extension 88 rotates from the first position to the second position, the flow of cold water through the bore 66c increases to a maximum when the extension 88 reaches the second arm 32 due to the shape of the bore 66c. Once the first extension 88 contacts the second arm 32, the first rotatable disk 50 is in the fully open position and the maximum amount of cold water is permitted to flow to the outlet bore 42. The configuration of bore 64h allows hot water to flow through first rotatable disk 50 irrespective of its angular position.

To provide a flow of hot water to the outlet bore 42, the second disk driver 62 is rotated between the first and second positions by applying a force to the second extension 90. Rotation of the disk driver 62 causes concurrent rotation of the second rotatable disk 52, whereby sufficient rotation of the disk 52 causes the bore 66h to align with the second bore 16h of the bottom portion 20, thereby allowing a flow of hot water to enter the valve body 12. As the second extension 90 rotates from the first position to the second position, the flow of hot water through the bore 66h increases to a maximum when the extension 88 reaches the second arm 32 due to the shape of the bore 66c. Once the second extension 90 contacts the second arm 32, the second rotatable disk 52 is in the fully open position and the maximum amount of hot water is permitted to flow to the outlet bore 42. The configuration of bore 64c allows cold water to flow through second rotatable disk 52 irrespective of its angular position.

In passing through the bores 66c, 66h of the respective rotatable disks 50, 52, the hot and cold water ultimately reach the outlet bore 42 via the bores 64c, 64h formed in the first and second rotatable disks 50, 52. Specifically, when the first rotatable disk 50 is in the first position, thereby not allowing a flow of cold water to reach the outlet bore 42, a flow of hot water is permitted to flow through the first rotatable disk 50 and reach the second rotatable disk 52 via the bore 64h formed in the first rotatable disk 50. In this regard, a stream of hot water may be selectively adjustable when the first rotatable disk 50 is in the first position. The same relationship exists with respect to a flow of cold water. When the first rotatable disk 50 is in the second position, thereby allowing a flow of cold water to reach the outlet bore 42, and the second rotatable disk 52 is in the first position, thereby not allowing a flow of hot water to reach the outlet bore 42, the cold water will reach the outlet bore 42 via the bore 64c of the second rotatable disk 52. In this manner, the first and second rotatable disks 50,52, provide the valve assembly 10 with the ability to independently control the flow of hot and cold water exiting the bore 42.

In the foregoing description, it should be understood that the flow of water entering through the first and second bores 16c, 16h is permitted to flow through the bores 82c, 82h formed in the stationary disks 54, 56, 58, whereby the bores 82c, 82h are aligned with the bores 16c, 16h of the bottom portion 20. In this regard, the bores 82c, 82h provide a path for the water to pass between the rotatable disks 50, 52 and ensure that the water reaches the outlet bore 42 of the valve cap 14.

With reference to FIG. 4, a second embodiment of the valve assembly 10a is provided, whereby the valve assembly 10a is operable to independently set the temperature and the flow rate of a outlet flow through the assembly 10. In view of the substantial similarity in structure and function of the components associated with the valve assembly 10 with respect to the valve assembly 10a, like reference numerals are used hereinafter and in the drawings to identify like components while like reference numerals containing letter extensions are used to identify those components that have been modified.

The valve assembly 10a includes the same components as the valve assembly 10 except for modifications to the first and second rotatable disks 50, 52. In this regard, a detailed description of the common components is foregone. The first rotatable disk 50a is operable to control the flow rate at which the water is allowed to flow through the valve body 12. To accomplish adequate flow control, a first and second bore 64c, 64h are formed through the first rotatable disk 50a. The first and second bores 64c, 64h are formed diametrically opposed to one another and include a generally quartercircular or triangular-shaped aperture, as best shown in FIG. 4. When the extension 88 of the first driver 60 is in contact with the first arm 30, the flow is essentially restricted from passing through the first rotatable disk 50a. As a force is applied to the extension 88, the first disk driver 60 causes rotation of the first rotatable disk 50a. As the first extension 88 approaches the second arm 32 of the valve body 12, the bores 64c, 64h begin to align with the first and second bores 16c, 16h of the bottom portion 20, thereby allowing a flow of water through the first disk 50a. Once the extension 88 contracts the second arm 32, the first rotatable disk 50a is in the fully open position and the maximum flow of water through the first rotatable disk 50a is achieved.

To control the temperature of the water flow, the second rotatable disk 52a includes bores 66c, 66h formed adjacent each other and include a generally triangular shape, as best shown in FIG. 4. When the extension 90 is in contact with the first arm 30, cold water is permitted to flow through the first bore 66c. As a force is applied to the extension 90, the second rotatable disk 52a is caused to rotate, thereby allowing the second bore 66h to align with the second bore 16h of the bottom portion 20. When the bore 66h aligns with the second bore 16h of the bottom portion 20, a flow of hot water is permitted to flow through the second rotatable disk 52a. When the extension 90 is positioned such that it is disposed generally between the first and second arms 30, 32 a mixture of hot and cold water flows through the second rotatable disk 52a, thereby providing a generally warm stream of water exiting the outlet bore 42. Once the extension 90 contacts the second arm 32, the bore 66c is no longer aligned with the first bore 16c of the bottom portion 20 while the second bore 66h is perfectly aligned with the second bore 16h of the bottom portion 20. In this regard, when the extension 90 contacts the second arm 32, the flow of water will be at its hottest temperature. In this manner, the first and second disks 50a, 52a allow for independent adjustment of both the temperature and flow rate of the water exiting the outlet bore 42.

In the foregoing description, it should be understood that the flow of water entering through the first and second bores 16, 16h is permitted to reach the first and second rotatable disks 50a, 52a due to the bores 82c, 82h formed in the stationary disks 54, 56, 58 when aligned with the bores 16c, 16h of the bottom portion 20. In this regard, the bores 82c, 82h provide a path for the water to pass between the rotatable disks 50a, 52a and ensure that the water reaches the outlet bore 42 of the valve cap 14.

Figure 7:
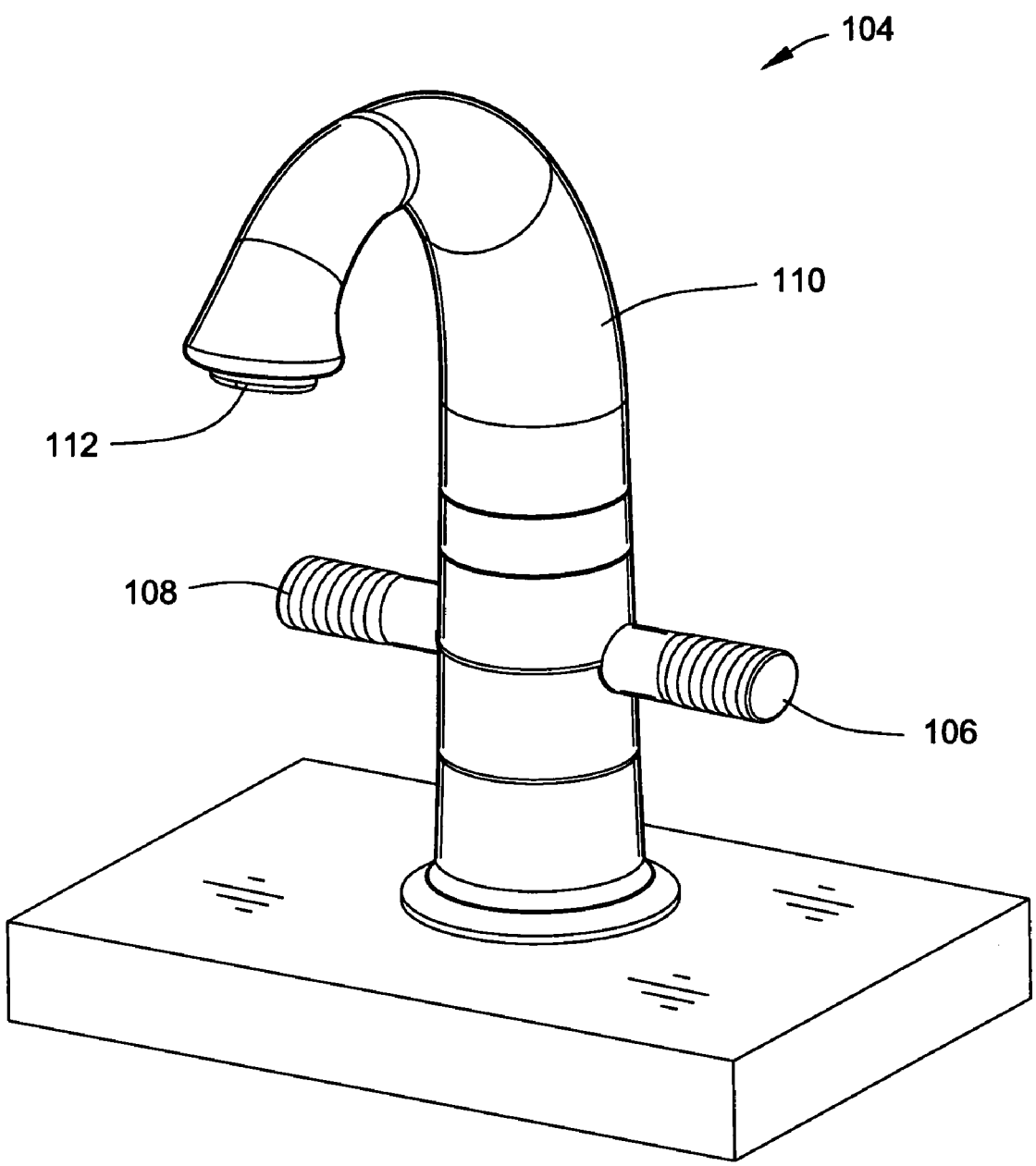
FIG. 7 illustrates a first preferred embodiment of a faucet assembly utilizing the valve assembly of the present invention.
Figure 8:
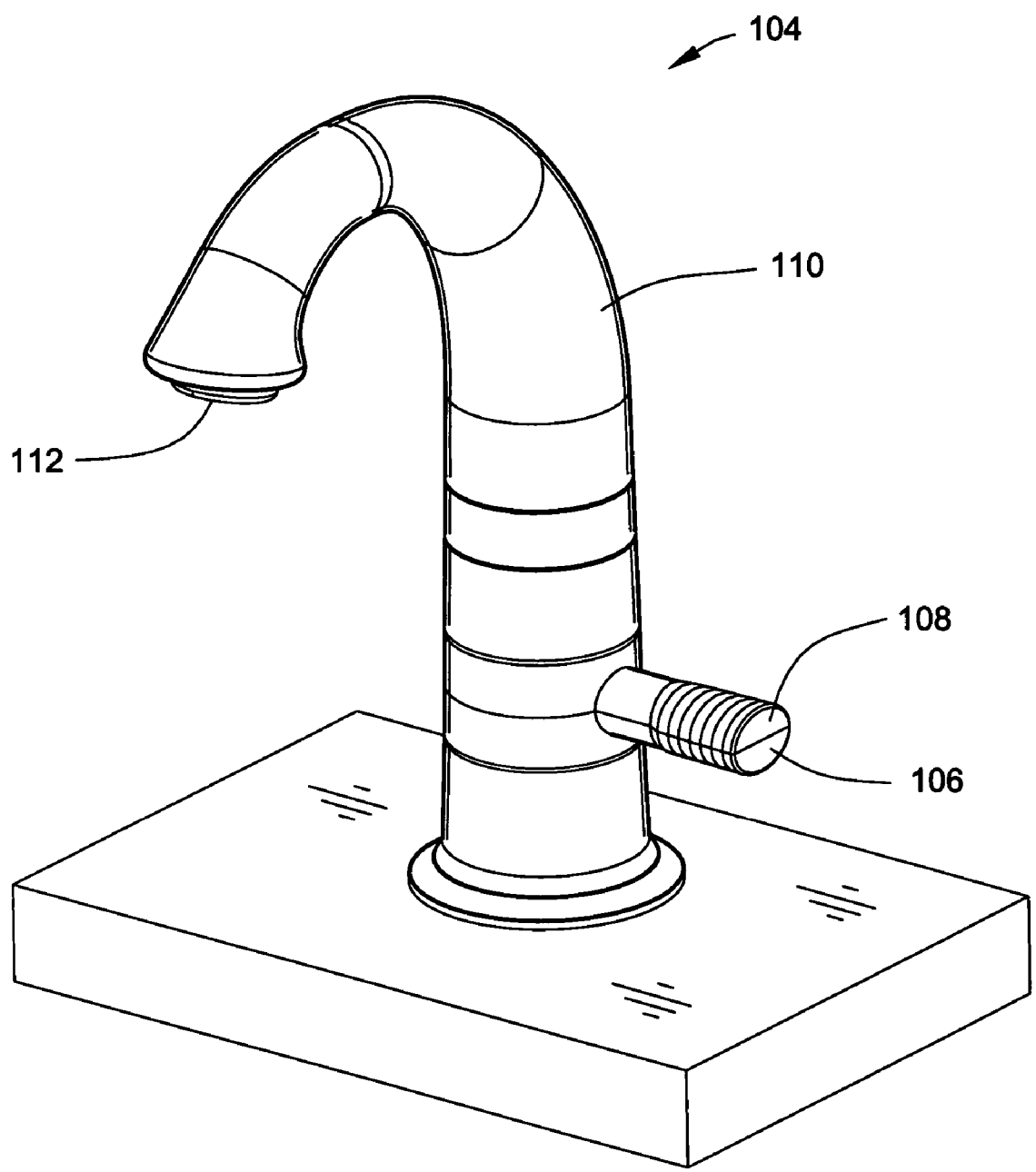
FIG. 8 illustrates a second preferred embodiment of a faucet assembly incorporating the valve assembly of the present invention.

With reference to FIGS. 7–8, the valve assembly 10 is shown incorporated into a faucet assembly 104. It should be understood that while the valve assembly 10 is shown assembled to the respective faucets 104, that the valve assembly 10a could also be substituted in its place due to the fact that the overall dimensions of the valve assembly 10 are comparable to the overall dimensions of the valve assembly 10a. Thus, the present invention provides a valve assembly that may be re-configured for a given faucet application in a simple manner. The faucet assemblies 104 each include a first and second handle 106, 108, whereby the handles 106, 108 are fixedly attached to the first and second extensions 88, 90 of the first and second disk drivers 60, 62. In this regard, applying a force to the handles 106, 108 will essentially transmit the force to the rotatable disks 60, 62, thereby rotating the rotatable disks 50, 52 and control the hot/cold water flow or alternatively control the temperature and flow rate through the outlet bore 42. In addition, the outlet bore 42 is aligned with a neck 110 of the faucet 104, whereby the neck 110 of the faucet 104 is operable to transport the water flow to a predetermined location where the water exits the faucet 104 via an outlet port 112.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A flow-through valve comprising:
   a valve housing having an outer wall portion connecting first and second axially offset end portions;
   first and second inlet ports arranged on said first end portion;
   an outlet port arranged on said second end portion;
   a first moveable disk disposed in said housing and having a first control port, a first pass-through port and a first actuating arm extending radially therefrom, said first moveable disk rotatable within said valve housing to selectively align said first control port with said first inlet port to said outlet port; and
   a second moveable disk disposed in said housing and having a second control port and a second pass-through port, said second moveable disk rotatable within said valve housing to selectively align said second control port with said second inlet port so as to provide fluid communication from said second inlet port through said first pass-through port and said second control port to said outlet port.

2. The flow-through valve of claim 1 wherein said first inlet port communicates with a first water source and wherein said second inlet port communicates with a second water source.

3. The flow-through valve of claim 1 wherein said first and second moveable disks are independently rotatable.

4. The flow-through valve of claim 3 wherein said actuating arms are accessible through a passage formed in said wall of said valve housing.

5. A flow-through valve comprising:
   a valve housing having an outer cylindrical wall connecting first and second axially offset end portions to allow in-line fluid flow from said first end portion to said second end portion, a first and second inlet port arranged on said first end portion, an outlet port arranged on said second end portion;
   a first fixed disk disposed in said housing and having an opening thereon;
   a first moveable disk disposed in said housing and in fluid communication with said first fixed disk, said first moveable disk rotatable within said valve housing and cooperating with said first fixed disk to selectively control fluid communication from said first and second inlet port to said outlet port, said first moveable disk including a first actuating arm extending radially therefrom for selectively rotating said first moveable disk;
   a second fixed disk disposed in said housing having an opening thereon; and
   a second moveable disk disposed in said housing and in fluid communication with said second fixed disk, said second moveable disk rotatable within said valve housing and cooperating with said second fixed disk to selectively control fluid communication from said second fixed disk to said outlet port, said second moveable disk including a second actuating arm extending radially therefrom for selectively rotating said second moveable disk.

6. The flow-through valve of claim 5 wherein said first inlet port communicates with a first water source and wherein said second inlet port communicates with a second water source.

7. The flow-through valve of claim 5 wherein said first and second actuating arms are accessible through a passage incorporated on said cylindrical wall of said valve housing.

8. A water faucet comprising:
   a body having a base communicating with first and second inlet ports, a spout for discharging water from the faucet and an intermediate portion defining a neck connecting said base and said spout;
   a valve cartridge interposed between said first and second inlet port and said outlet port, said valve cartridge comprising:
      a valve body having a valve inlet port communicating with said first and second inlet port;
      a valve outlet port axially offset from said valve inlet port and communicating with said spout;
      a first moveable disk having a first control port and a first pass-through port, said first moveable disk rotatable to selectively align said first control port with said first inlet port and said valve outlet port, said first pass-though port being aligned with said second inlet port regardless of the alignment of the first control port;

a second moveable disk having a second control port and a second pass-through port, said second moveable disk rotatable to selectively align said second control port with said second inlet port so as to provide fluid communication from said valve inlet port through said first pass-through port and said second control port to said valve outlet port, said second pass-though port being aligned with said first inlet port regardless of the alignment of the second control port; and first and second levers operably coupled with said first and second moveable disks respectively whereby rotation of said levers adjusts fluid flow from said first and second inlet ports to said spout.

9. The water faucet of claim 8 wherein said neck includes a first portion extending from said base, a second portion extending generally perpendicularly to said first portion and a third portion connecting said second portion to said spout.

10. The water faucet of claim 9 wherein said first and second levers are independently rotatable about said neck.

11. The water faucet of claim 10 wherein said first and second levers are rotatably coupled to said first portion of said neck.

12. The water faucet of claim 10 wherein said first and second levers are rotatably coupled to said second portion of said neck.

13. The water faucet of claim 9 wherein said first and second levers extend outwardly from said neck and are aligned at least when the faucet is in an off position.

14. The water faucet of claim 9 wherein said first and second levers extend outwardly from said neck and are opposed at least when the faucet is in an off position.

15. The water faucet of claim 8 wherein said first lever cooperates with said first moveable disk of said valve to control water flow from a first water source to said spout and said second lever cooperates with said second moveable disk of said valve to control water flow from a second water source to said spout.

16. A water faucet comprising:
a faucet body having an outlet;
a flow-through valve disposed in said faucet body and including a valve body, a first rotatable disk, and a second rotatable disk, said flow-through valve having a first port coupled to a supply line at a first end and a second port at a second end opposite said first end in fluid communication with said outlet, said flow-through valve operable to regulate fluid flow in an axial direction through rotation of said first rotatable disk and said second rotatable disk; and a handle operably connected to said flow-through valve and extending from said faucet body generally perpendicularly from said axial direction;

wherein at least one of said first rotatable disk and said second rotatable disk includes a control port and a pass-through port, said control port operable to control fluid flowthrough said at least one of said first rotatable disk and said second second rotatable disk and said pass-through port operable to allow fluid communication between said first rotatable disk and said second rotatable disk without controlling fluid flow therethrough.

17. The water faucet of claim 16 wherein said first disk includes a first control port and a first pass-through port, said first control port operable to control fluid flow through said first disk and said first pass-through port operable to allow fluid communication between said first disk and said second disk.

18. The water faucet of claim 16 wherein said second disk includes a second control port and a second pass-through port, said second control port operable to control fluid flow through said second disk and said second pass-through port operable to allow fluid communication between said first disk and said second disk.

19. The water faucet of claim 16 wherein said first disk includes a first extension projecting through said valve body, and said second disk includes a second extension projecting through said valve body.

20. The water faucet of claim 19 wherein said handle includes a first arm operable to engage said first extension to rotate said first disk and a second arm operable to engage said second extension to rotate said second disk independent of said first disk.

21. The water faucet of claim 20 wherein said first handle is operable to adjust a fluid flow rate through said flow-through valve, and said second handle is operable to adjust a fluid temperature through said flow-through valve.

22. The water faucet of claim 20 wherein said first handle is operable to adjust a flow rate of a first fluid through said flow-through valve, and said second handle is operable to adjust a flow rate of a second fluid through said flow-through valve.

* * * * *